United States Patent
Watanabe

(10) Patent No.: US 8,463,472 B2
(45) Date of Patent: Jun. 11, 2013

(54) CHARGE MONITORING APPARATUS

(75) Inventor: Jin Watanabe, Toyota (JP)

(73) Assignee: Yazaki Corporation, Tokyo (JP)

( * ) Notice: Subject to any disclaimer, the term of this patent is extended or adjusted under 35 U.S.C. 154(b) by 587 days.

(21) Appl. No.: 12/635,126

(22) Filed: Dec. 10, 2009

(65) Prior Publication Data

US 2010/0145568 A1    Jun. 10, 2010

(30) Foreign Application Priority Data

Dec. 10, 2008   (JP) ................................ 2008-314815

(51) Int. Cl.
*H02J 7/00* (2006.01)
*B60K 6/20* (2007.10)

(52) U.S. Cl.
USPC ........... 701/22; 701/29.6; 701/33.4; 701/450; 320/109

(58) Field of Classification Search
None
See application file for complete search history.

(56) References Cited

U.S. PATENT DOCUMENTS

| | | | |
|---|---|---|---|
| 5,499,181 A * | 3/1996 | Smith ........................ | 455/456.1 |
| 5,596,261 A | 1/1997 | Suyama | |
| 6,067,008 A * | 5/2000 | Smith ........................... | 340/438 |
| 2008/0052145 A1 | 2/2008 | Kaplan et al. | |
| 2009/0043450 A1 | 2/2009 | Tonegawa et al. | |
| 2009/0184833 A1 | 7/2009 | Tonegawa et al. | |
| 2009/0251300 A1* | 10/2009 | Yasuda et al. .............. | 340/426.1 |
| 2010/0161483 A1* | 6/2010 | Littrell ............................. | 705/40 |
| 2010/0161517 A1* | 6/2010 | Littrell ........................... | 705/412 |

FOREIGN PATENT DOCUMENTS

| | | |
|---|---|---|
| EP | 1995109 A1 | 11/2008 |
| JP | 5-227669 A | 9/1993 |
| JP | 7-105480 A | 4/1995 |
| JP | 2000-231570 A | 8/2000 |
| JP | 2004-205344 A | 7/2004 |
| JP | 2004-246518 A | 9/2004 |
| JP | 2007-230520 A | 9/2007 |
| JP | 2008-108235 A | 5/2008 |
| JP | 2008-278740 A | 11/2008 |
| WO | 2008/123617 A1 | 10/2008 |

OTHER PUBLICATIONS

Office Action dated Jan. 22, 2013 issued by the Japanese Patent Office in counterpart Japanese Patent Application No. 2008-314815.
German Office Action, dated Mar. 22, 2013, issued by the German Patent Office in corresponding German Application No. 10 2009 054 483.6.

* cited by examiner

*Primary Examiner* — Michael J Zanelli
(74) *Attorney, Agent, or Firm* — Sughrue Mion, PLLC

(57) ABSTRACT

A charge monitoring apparatus is mountable on or connectable to a vehicle which uses electrical power supplied from a battery on the vehicle for traveling. The charge monitoring apparatus includes a vehicle ID holding portion that holds vehicle-side identification information which is uniquely allocated to each specific vehicle, a power-line communicating portion that performs a power line communication with an extravehicular apparatus through a power supply line which supplies the electric power from the external power supply equipment to the battery, a vehicle-side information storing portion that stores information produced in the vehicle, and a communication controlling portion that, in the power line communication, transmits the vehicle-side identification information held in the vehicle ID holding portion to the extravehicular apparatus, and if predetermined condition is satisfied, the communication controlling portion transmits the information stored in the vehicle-side information storing portion to the extravehicular apparatus.

6 Claims, 8 Drawing Sheets

FIG. 7

| HISTORY NUMBER | VEHICLE-SIDE ID | CONNECTION TIME |
|---|---|---|
| 001 | ABC1234 | 311 |
| 002 | DEF5678 | 252 |
| ⋮ | ⋮ | ⋮ |
| 006 | XYZ9876 | 432 |
| ⋮ | ⋮ | ⋮ |

FIG. 8

| HISTORY NUMBER | POWER SUPPLY-SIDE ID | CONNECTION TIME |
|---|---|---|
| 001 | xyz1234 | 211 |
| 002 | def5678 | 355 |
| ⋮ | ⋮ | ⋮ |
| 006 | xyz09876 | 333 |
| ⋮ | ⋮ | ⋮ |

144

CHARGE MONITORING APPARATUS

BACKGROUND

The present invention relates to a charge monitoring apparatus for monitoring an operation of charging a battery mounted on a vehicle such as an electric vehicle or a hybrid vehicle.

In the automobile industry, recently, an electric vehicle which travels by using only electricity as energy, and a hybrid vehicle on which both an engine and an electric motor are mounted are practically used from the standpoints of carbon dioxide emission reduction and efficient use of energy. In a usual hybrid vehicle, kinetic energy generated when the vehicle is decelerated is recovered while being converted to electric energy, and then charged into a battery, and the recovered electric energy is used in traveling to suppress consumption of a fuel such as gasoline. In the case where only the recovery of kinetic energy generated when a vehicle is decelerated is used, however, the effect of reducing the fuel consumption is small, and also the effect of reducing carbon dioxide is small.

In order to enhance the effect of reducing carbon dioxide, therefore, a plug-in hybrid vehicle (plug-in HV) has been developed. A plug-in hybrid vehicle has a function that a plug disposed on the vehicle is inserted into a domestic power supply socket or the like and a battery of the vehicle is charged by a domestic power supply (commercial AC power supply: AC 100 V or the like). In addition to kinetic energy which can be recovered when the vehicle is decelerated, therefore, also electric energy which is obtained from the domestic power supply by charging can be used in travel of the vehicle. Consequently, the use frequency of the electric motor can be enhanced to suppress the fuel consumption, and the electric motor which has a high efficiency can be used highly frequently to enhance the effect of reduction of carbon dioxide.

On the other hand, in order to enhance the effect of reducing carbon dioxide which is discharged in relation to a vehicle, also an economical driving operation is very effective. When a driving operation accompanied by large fuel consumption in a short time period, such as a case where sudden acceleration is performed during driving of a vehicle is eliminated, for example, the fuel consumption can be suppressed, and the effect of reducing carbon dioxide can be enhanced.

As a technique available for enabling the driver of a vehicle to perform an economical driving operation, conventionally, a tachograph and a navigation apparatus have been put into practical application and used.

A tachograph periodically obtains information indicating the driving situation of a vehicle, such as the vehicle speed and the number of revolutions of the engine, and records the information as time series information. A business such as a taxi company or a trucking company refers to and analyzes the time series information recorded by the tachograph, so that it is possible to know whether the driver of the vehicle performs an economical driving operation or not. This can be used for enhancing the effect of reducing carbon dioxide.

A navigation apparatus can perform the following operations: the current position of a vehicle on which the apparatus is mounted is measured, and map information related to the vicinity of the current position is displayed on a screen; a possible travelling route from the current position to the destination is automatically determined; and latest traffic information such as information indicating the traffic jam situation, or the accident occurrence situation is obtained, and the information is reflected into a change of the possible travelling route. When a navigation apparatus is used, for example, it is possible to determine the possible travelling route so that the vehicle travels through the shortest route, or change the possible travelling route so that the route avoids a jammed location or a location of an accident. Therefore, this can be used for enhancing the effect of reducing carbon dioxide.

In an actual use of a tachograph, in order to enable an administrator in a taxi company, a trucking company, or the like to know the travelling situations of vehicles, however, a large amount of information stored in tachographs mounted on the vehicles must be retrieved from the tachographs, and then transferred to an apparatus (for example, a personal computer) on the side of the administrator.

For example, Patent Reference 1 discloses a conventional technique for transferring information from a tachograph which is a vehicle-mounted apparatus to an apparatus on the side of the administrator. Patent Reference 1 proposes information transfer in which a wireless communication interface that can perform packet communication is used, or a detachable memory card is used.

By contrast, in the case where a navigation apparatus is used, for example, latest map information or the like is always necessary in order to determine an optimum possible travelling route. When, although a new road which can avoid a jammed location included in a possible travelling route has been completed, old map information in which information of the new road is not reflected is used, for example, it is impossible to avoid the jammed location, and hence the effect of reducing carbon dioxide cannot be sufficiently enhanced.

In the case where a navigation apparatus for a vehicle is used, conventionally, map information or the like that is used in the navigation apparatus which is a vehicle-mounted apparatus is usually updated to latest information by using a detachable information recording medium such as a CD (Compact Disc) or a DVD, or by using mobile packet communication. In the conventional technique disclosed in Patent Reference 2, when map data are to be updated, for example, the use of differential data is enabled in order to reduce the amount of data to be transferred by communication.

[Patent Reference 1] JP-A-2008-108235
[Patent Reference 2] JP-A-2008-249624

In the case where a public wireless communication network is used in the data transfer from a tachograph which is a vehicle-mounted apparatus to an extravehicular administrating apparatus, however, there is a problem in that, when the data amount is increased, the communication cost such as the packet communication fee is raised, and another problem of security arises. In the case where data are transferred by using a detachable recording medium such as a memory card, there is a possibility that leakage of information to a third party may be caused by a loss of the memory card, or that accumulated important data may be lost by physical breakage of the memory card.

Also in the case where a navigation apparatus is used, similarly, there is a problem in that, when a public wireless communication network is used in update of a database such as a map used in the apparatus to latest information, the communication cost is raised. In the case where the database is to be updated by using a detachable information recording medium such as a CD or a DVD, a reading apparatus (such as a DVD drive) for reading data from such a dedicated information recording medium is necessary, and there is a possibility that the information recording medium may be physically broken.

SUMMARY

The invention has been conducted in view of the above-discussed situation. It is an object of the invention to provide a charge monitoring apparatus in which, in the case where the function of a tachograph or a navigation apparatus is used in an electric vehicle or plug-in hybrid vehicle that is chargeable, the burden such as a communication cost due to information transfer, or the like can be reduced.

In order to achieve the above object, according to the present invention, there is provided a charge monitoring apparatus that is mountable on or connectable to a vehicle which uses electrical power supplied from a battery on the vehicle for traveling, the charge monitoring apparatus monitoring a supply of the electrical power to the battery from an external power supply equipment which is disposed separately from the vehicle, the charge monitoring apparatus, comprising:

a vehicle ID holding portion that holds vehicle-side identification information which is uniquely allocated to each specific vehicle;

a power-line communicating portion that performs a power line communication with an extravehicular apparatus through a power supply line which supplies the electric power from the external power supply equipment to the battery, the extravehicular apparatus connected to the external power supply equipment;

a vehicle-side information storing portion that stores information produced in the vehicle; and a communication controlling portion that, in the power line communication, transmits the vehicle-side identification information held in the vehicle ID holding portion to the extravehicular apparatus, and if predetermined condition is satisfied, the communication controlling portion transmits the information stored in the vehicle-side information storing portion to the extravehicular apparatus.

Preferably, the information stored in the vehicle-side information storing portion includes a vehicle speed and a number of revolutions of an engine of the vehicle.

Preferably, the information stored in the vehicle-side information storing portion includes at least one of traffic information and history information of traveling route of the vehicle.

Preferably, the charge monitoring apparatus includes an information update controlling portion that, in the power line communication, receives information sent from the extravehicular apparatus via the power-line communicating portion, and updates a content of the information stored in the vehicle-side information storing portion, by using the received information.

Preferably, in the power line communication, the communication controlling portion receives connection destination identification information indicating the extravehicular apparatus from the extravehicular apparatus via the power supply line, and compares the connection destination identification information with pre-registered information preliminary registered in the vehicle, and only in a case of coincidence between the connection destination identification information and the pre-registered information, the communication controlling portion transmits information stored in the vehicle-side information storing portion to the extravehicular apparatus.

According to the present invention, there is also provided a charge monitoring apparatus that is connectable through a power supply line to a vehicle which uses electrical power supplied from a battery on the vehicle for traveling, the charge monitoring apparatus being connected to an external power supply equipment which is disposed separately from the vehicle, in order to monitor a supply of the electrical power from the external power supply equipment to the battery, the charge monitoring apparatus, comprising:

a power supply ID holding portion that holds power supply-side identification information which is uniquely allocated to a specific external power supply equipment;

a power-line communicating portion that performs a power line communication with a communication portion on the vehicle through a power supply line which supplies the electric power from the external power supply equipment to the battery; and a power supply-side reception controlling portion that, in the power line communication, transmits the power supply-side identification information held in the power supply ID holding portion to the vehicle, receives information transmitted from the vehicle via the power supply line, and stores the received information in a power supply-side storing portion.

Preferably, the charge monitoring apparatus further includes a map information holding portion that successively obtains latest map information, and a power supply-side transmission controlling portion that, in the power line communication, transmits the latest map information held in the map information holding portion to the vehicle via the power supply line.

According to the charge monitoring apparatus, when the vehicle and the external power supply equipment are connected to each other and the battery on the vehicle is charged by using the electrical power supplied from the external power supply equipment (in the power line communication), the information stored in the vehicle-side information storing portion can be transmitted under the control of the communication controlling portion to the extravehicular apparatus. Namely, information can be transferred from the vehicle to the external power supply equipment while using the power supply line which, in order to charge the battery, connects the external power supply equipment to the vehicle, as a signal transmission line. Therefore, it is not required to use a public wireless communication network, and to use a detachable information recording medium such as a memory card. Consequently, the communication cost can be reduced, a security problem such as leakage of information can be solved, and a loss of stored information due to physical breakage of an information recording medium can be prevented from occurring. When a charging operation is to be performed, moreover, the vehicle-side identification information held in the vehicle ID holding portion is transmitted to the extravehicular apparatus. Therefore, the external power supply equipment can identify the connected vehicle, so that an unauthorized charging operation and the like can be prevented from being performed, and the transmission source can be identified.

According to the charge monitoring apparatus, information indicating the driving situation of the vehicle and stored in a tachograph mounted on the vehicle, such as the vehicle speed and the number of revolutions of the engine can be transferred to the external power supply equipment through the power supply line.

According to the charge monitoring apparatus, information stored in the navigation apparatus mounted on the vehicle, such as traffic information which is obtained by the navigation apparatus from facilities on the road and the like, and the history of the traveling route can be transferred to the side of the external power supply equipment through the power supply line.

According to the charge monitoring apparatus, the information update controlling portion can receive information sent from the extravehicular apparatus disposed on the external power supply equipment, via the power-line communicating portion, and, by using the received information, update the content of the information such as a map which is used by the navigation apparatus, to latest information, or update programs of the tachograph.

According to the charge monitoring apparatus, by the connection destination identification information received by the communication controlling portion, the external power supply equipment is identified on the vehicle, and it is checked whether the equipment coincides with that which is previously registered in the vehicle, or not. Therefore, it is possible to distinguish a situation where there is no fear of information leakage to a third party, such as the case where the apparatus is connected to the external power supply equipment via a power supply socket in the home of the owner of the vehicle, or that where the apparatus is connected to the external power supply equipment via a power supply socket in a company of a specific business, from that where security against information leakage cannot be ensured as in a public external power supply equipment. Consequently, the problem of security of information to be transferred can be solved.

According to the charge monitoring apparatus, when the vehicle and the external power supply equipment are connected to each other and the battery on the vehicle is charged by using the electrical power supplied from the external power supply equipment, the external power supply equipment can receive information transmitted from the vehicle through the power supply line. When information stored in a tachograph or navigation apparatus on the vehicle is to be transferred to an administrating apparatus which is outside the vehicle, therefore, it is not required to use a public wireless communication network, or to use a detachable information recording medium such as a memory card. Therefore, the cost of communication can be reduced; the problem of security such as leakage of information can be solved, and the stored information can be prevented from being destroyed by physical breakage of the information recording medium. When a charging operation is to be performed, moreover, the power supply-side identification information held in the power supply ID holding portion is transmitted to the vehicle. Therefore, the vehicle can identify the external power supply equipment of the connection destination, and the transmission destination of information can be restricted to a specific external power supply equipment which is secure.

According to the charge monitoring apparatus, the power supply-side transmission controlling portion which is disposed on the external power supply equipment transmits latest information held in the map information holding portion to the vehicle via the power-line communicating portion. In the vehicle side, by using the received information, therefore, the contents of a database such as a map which is used by, for example, the navigation apparatus can be updated to latest information.

When the charge monitoring apparatus of the invention is used, the burden such as a communication cost due to information transfer, or the like can be reduced in the case where the function of a tachograph or a navigation apparatus is used in an electric vehicle or plug-in hybrid vehicle that is chargeable. Namely, information is transferred by wire through the power supply line which, when a charging operation is to be performed, connects the vehicle to the external power supply equipment. Therefore, it is not required to use a public wireless communication network, and to use a detachable information recording medium such as a memory card. Consequently, the communication cost can be reduced, a security problem such as leakage of information can be solved, and a loss of accumulated information due to physical breakage of an information recording medium can be prevented from occurring.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7 is a view showing a configuration example of information held in a charging history holding portion 27 on a side of a power supply equipment;

FIG. 8 is a view showing a configuration example of information held in a charging history holding portion of the PLC unit disposed on the side of the plug-in hybrid vehicle.

DETAILED DESCRIPTION OF EXEMPLARY EMBODIMENTS

A specific embodiment of the charge monitoring apparatus of the invention will be described with reference to FIGS. 1 to 6.

Figure 1:
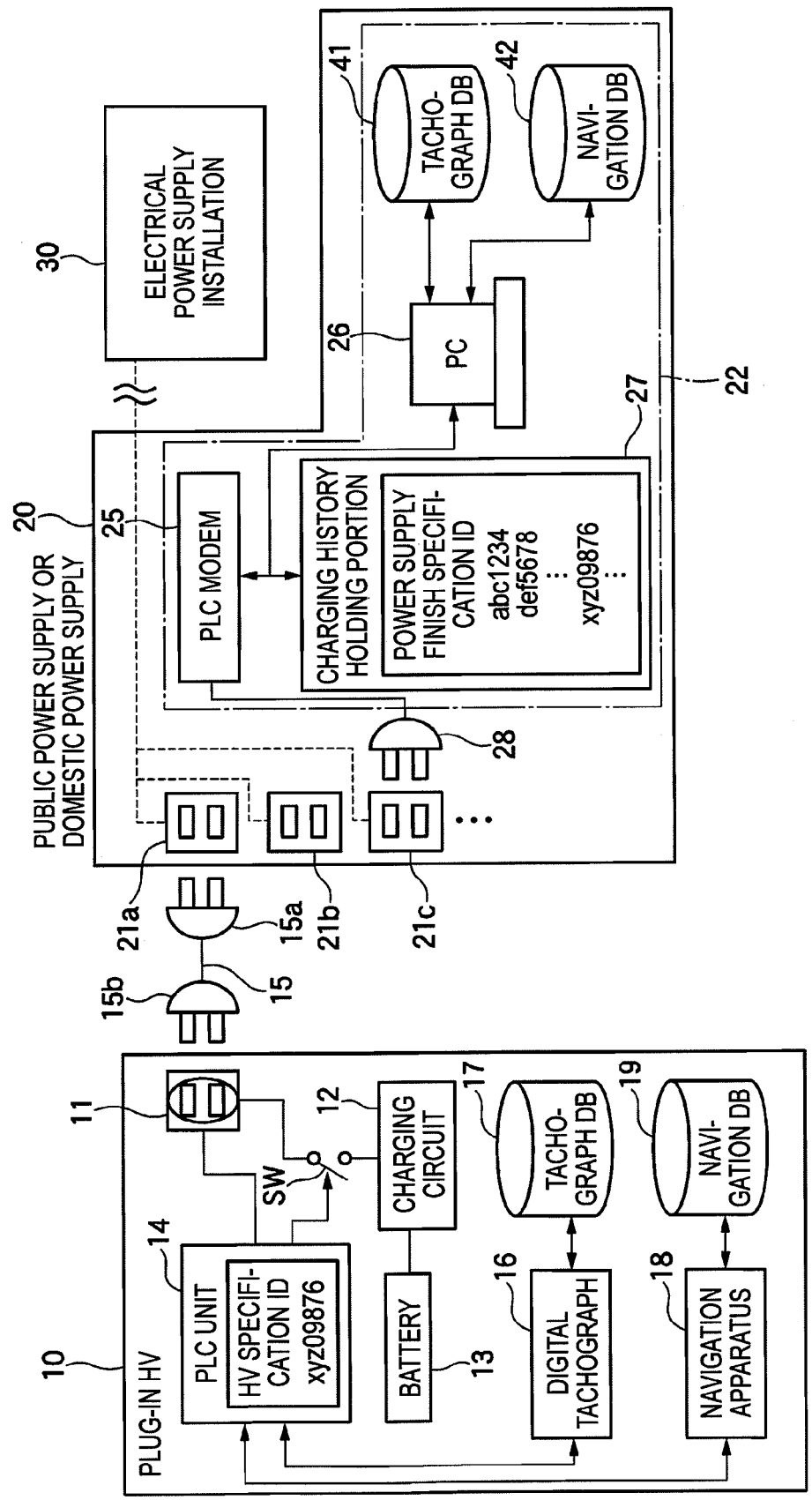
FIG. 1 is a block diagram showing a configuration example of a plug-in hybrid vehicle and a power supply equipment which is used in a charging operation in an embodiment.
Figure 2:
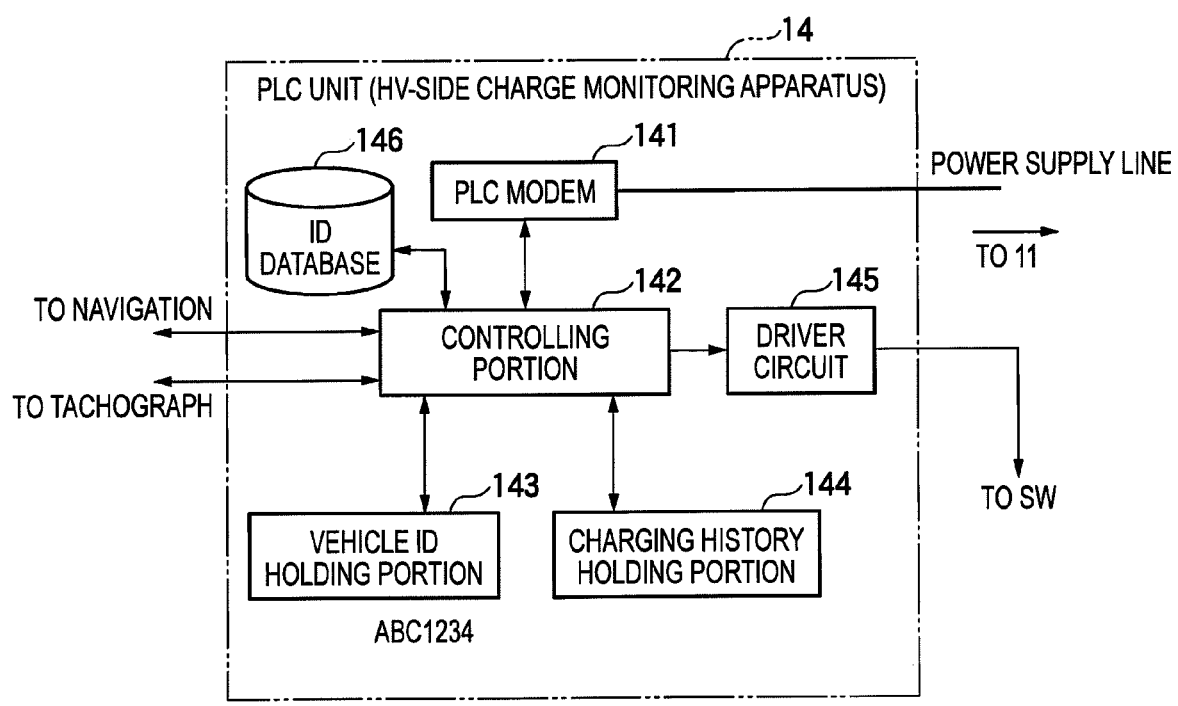
FIG. 2 is a block diagram showing the configuration of a PLC unit shown in FIG. 1.
Figure 3:
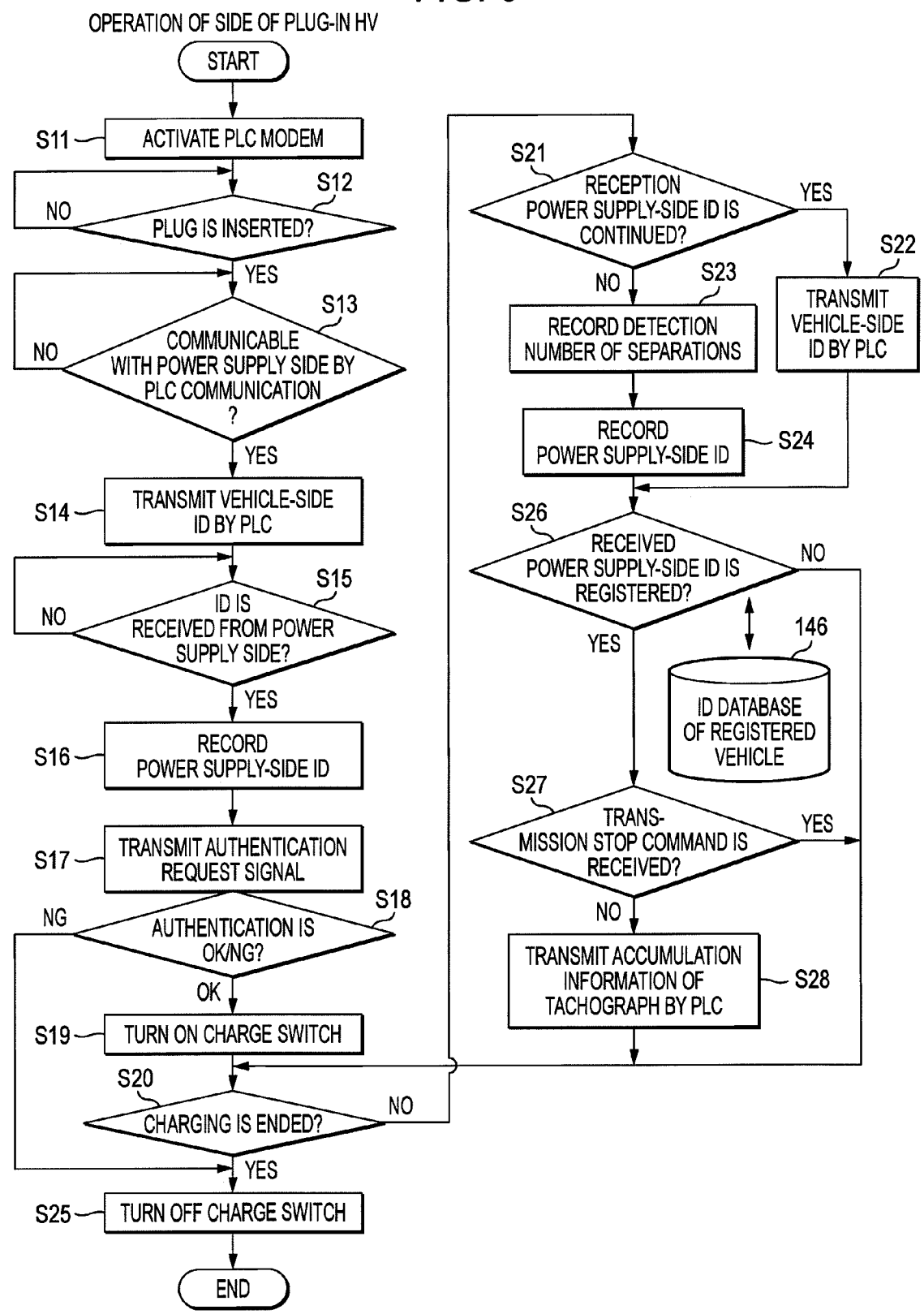
FIG. 3 is a flowchart showing the contents of the control of a PLC unit disposed on the side of the plug-in hybrid vehicle shown in FIG. 1.
Figure 4:
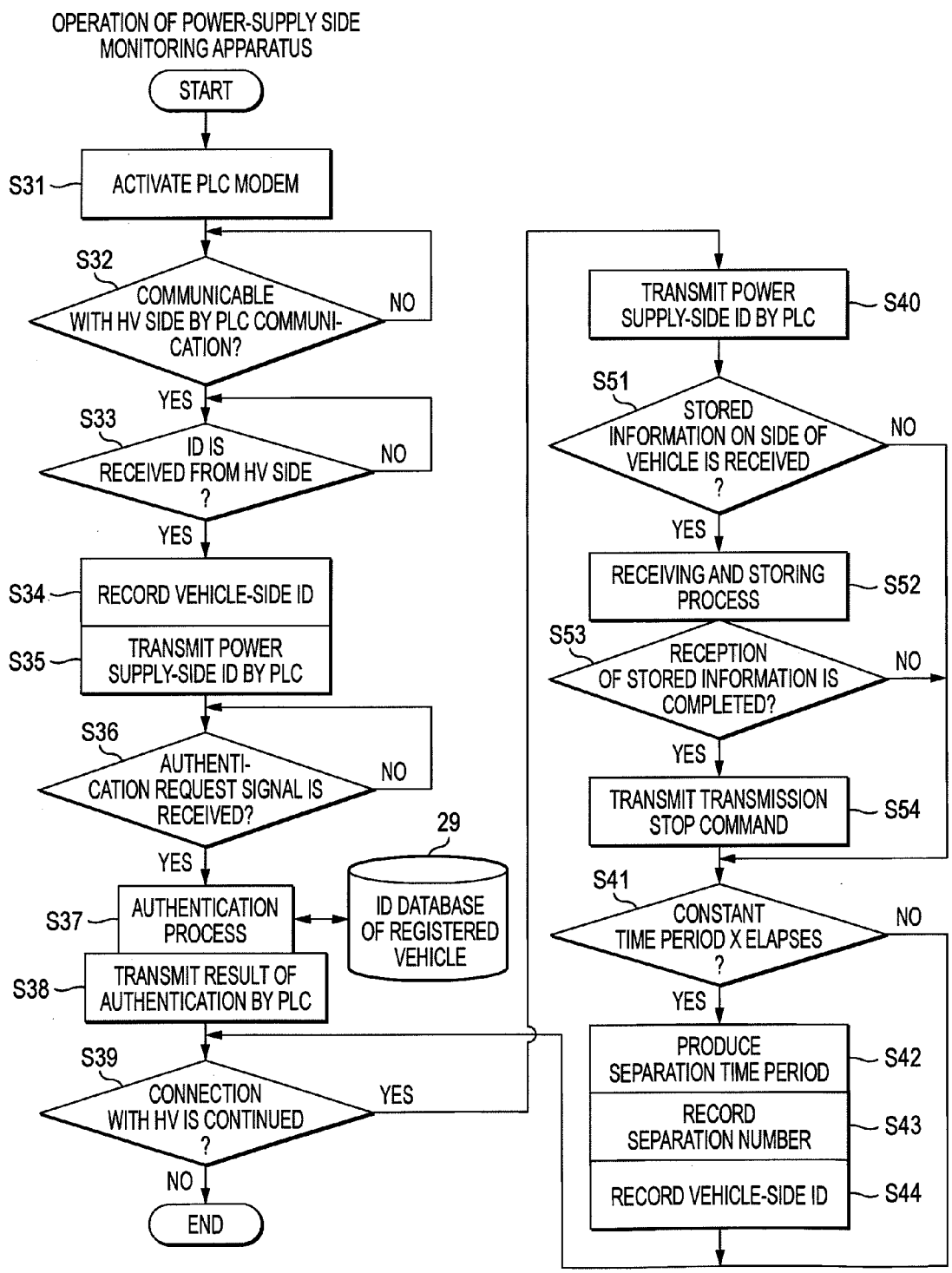
FIG. 4 is a flowchart showing the contents of the control of a power-supply side charge monitoring apparatus disposed on the side of the power supply equipment shown in FIG. 1.
Figure 5:
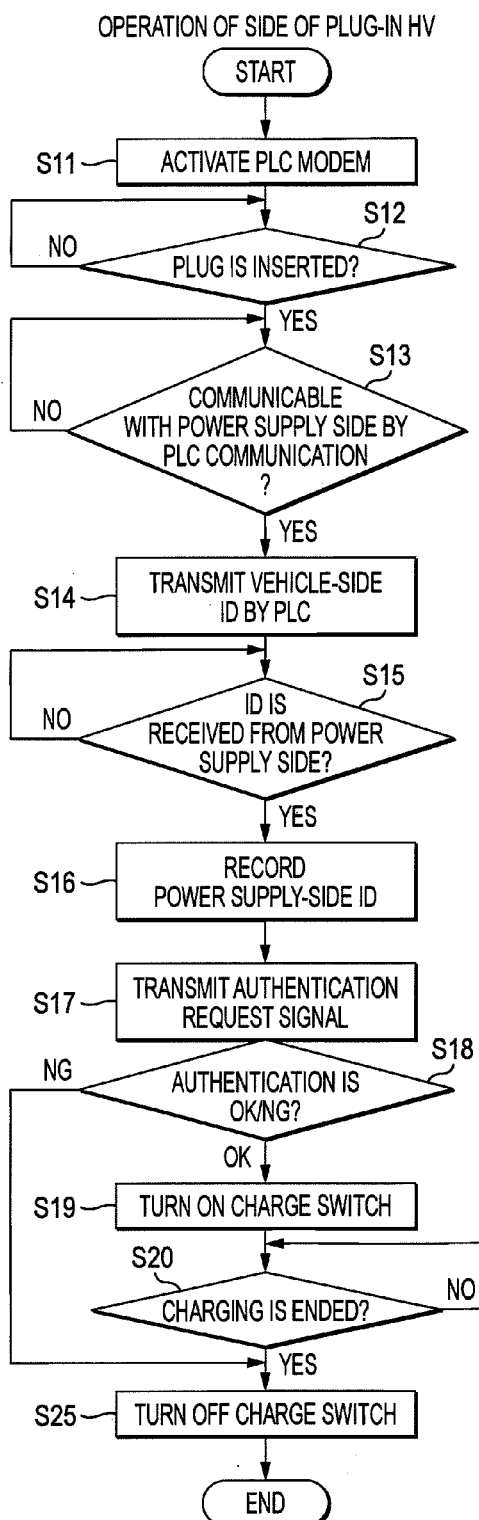
FIG. 5 is a flowchart showing a modification of the contents of the control of the PLC unit shown in FIG. 3.
Figure 5:
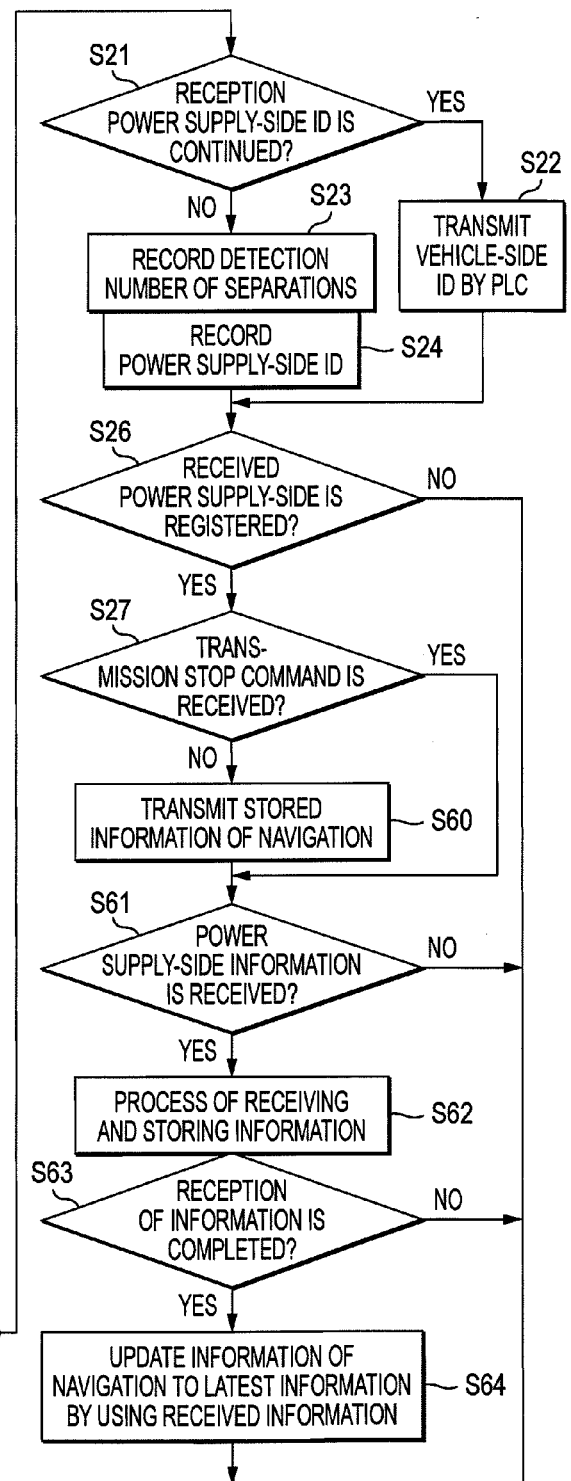
Figure 6:
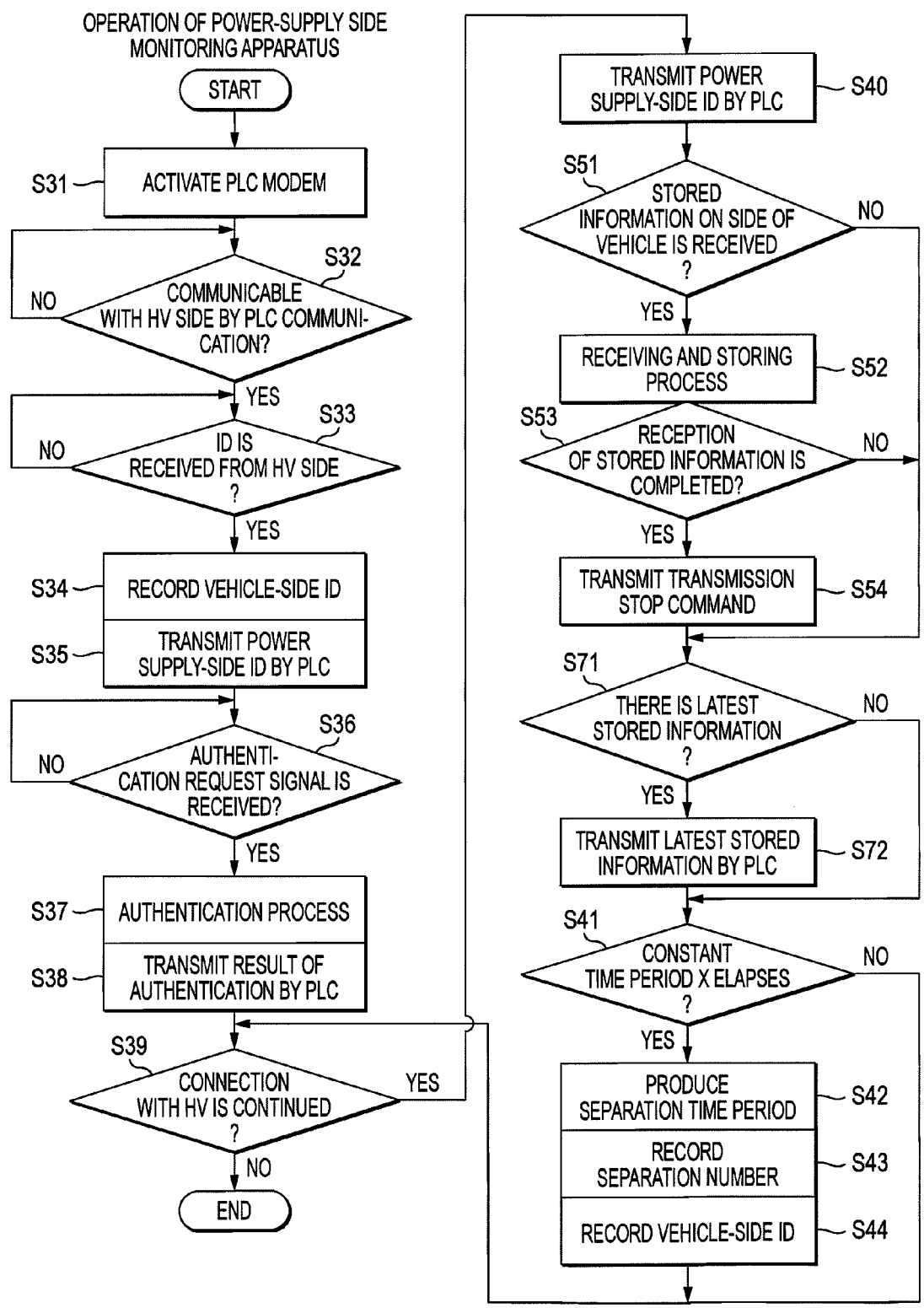
FIG. 6 is a flowchart showing a modification of the contents of the control of the power-supply side charge monitoring apparatus shown in FIG. 4.

FIG. 1 is a block diagram showing a configuration example of a plug-in hybrid vehicle and a power supply equipment which is used in a charging operation in the embodiment, FIG. 2 is a block diagram showing the configuration of a PLC unit shown in FIG. 1, FIG. 3 is a flowchart showing the contents of the control of the PLC unit disposed on the side of the plug-in hybrid vehicle shown in FIG. 1, FIG. 4 is a flowchart showing the contents of the control of a power-supply side charge monitoring apparatus disposed on the side of the power supply equipment shown in FIG. 1, FIG. 5 is a flowchart showing a modification of the contents of the control of the PLC unit shown in FIG. 3, and FIG. 6 is a flowchart showing a modification of the contents of the control of the power-supply side charge monitoring apparatus shown in FIG. 4.

In the embodiment, the case will be considered where, as shown in FIG. 1, the plug-in hybrid vehicle (HV) 10 is connected to the power supply equipment 20 through a charging electrical cable 15, and a battery 13 is charged by using electrical power which is supplied from the side of the power supply equipment 20 to the plug-in hybrid vehicle 10.

The plug-in hybrid vehicle 10 has a function of charging the battery 13 by using commercial AC power (for example, AC 100 V) which can be taken out from a usual domestic power supply socket. Therefore, the power supply equipment 20 may be an equipment which is disposed in a public place, or an equipment for the usual household as far as it can supply necessary commercial AC power. A predetermined electrical power supply installation 30 supplies electrical power to the power supply equipment 20. Usually, the electrical power supply installation 30 is an equipment of an electrical power company, and corresponds to a power substation, a pole transformer, or the like.

In the case of a power supply equipment in the usual household, a special apparatus for supplying electrical power to the plug-in hybrid vehicle 10, such as a fee charging apparatus is not disposed, and hence as in the power supply equipment 20 shown in FIG. 1, when a power supply plug 15a of the charging electrical cable 15 is connected to a power supply socket 21a, electrical power is always supplied from the power supply equipment 20 to the side of the plug-in hybrid vehicle 10. Therefore, the owner of the plug-in hybrid vehicle 10 or the like can perform a charging operation without obtaining permission from the owner of the power supply equipment 20, or without paying the electric power fee, and there is a possibility that the owner of the plug-in hybrid vehicle 10 or the like may perform an unauthorized charging operation (stealing of electricity).

As a countermeasure against stealing of electricity and the like on the side of the power supply equipment 20, therefore, the power-supply side charge monitoring apparatus 22 is disposed. The power-supply side charge monitoring apparatus 22 has also functions of obtaining and managing various kinds of information stored in the side of the plug-in hybrid vehicle 10, and providing necessary information to the plug-in hybrid vehicle 10.

As shown in FIG. 1, the power-supply side charge monitoring apparatus 22 includes a PLC (Power Lice Communications) modem 25, a personal computer 26, a charging history holding portion 27, a tachograph DB (database, the same shall apply hereinafter) 41, and a navigation DB 42. A power supply plug 28 disposed in a power supply cord of the PLC modem 25 is connected to one power supply socket 21c (or 21a or 21b).

The tachograph DB 41 is a storage region for obtaining information (the vehicle speed, the number of revolutions of an engine, and the like) from digital tachographs mounted on vehicles such as the plug-in hybrid vehicle 10, and managing the information in the personal computer 26. The navigation DB 42 is a storage region for providing information (for example, latest map information) which is required by vehicle navigation apparatuses mounted on the vehicles such as the plug-in hybrid vehicle 10, to the vehicle side, and obtaining information produced in the vehicle navigation apparatuses from the vehicle side to manage the information in the personal computer 26. The information held by the navigation DB 42 is successively updated to latest information.

Programs for realizing the functions of the power-supply side charge monitoring apparatus 22 are incorporated into the personal computer 26. When the personal computer 26 executes the programs, therefore, it is possible to perform a monitor control shown in FIG. 4. Unique identification information (power supply-side ID) for identifying the power supply equipment 20 is previously registered in the personal computer 26. Under the control of the personal computer 26, history information related to the charging operation of the plug-in hybrid vehicle 10 is produced, and then stored in the charging history holding portion 27. FIG. 7 shows a specific example of the history information stored in the charging history holding portion 27.

In place of the personal computer 26, a single-chip microcomputer into which programs are previously incorporated may be used, or the functions may be incorporated into the PLC modem 25.

In the side of the plug-in hybrid vehicle 10, a charging circuit 12 for charging the battery 13, a PLC unit (vehicle-side charge monitoring apparatus) 14, a digital tachograph 16, a tachograph DB 17, a navigation apparatus 18, and a navigation DB 19 are disposed.

The PLC unit 14 is connected to a power supply line of a vehicle-side socket 11. As described later, the PLC unit 14 has functions of dealing with an unauthorized charging operation such as stealing of electricity, and transferring information with respect to the side of the power supply equipment 20.

The digital tachograph 16 obtains various kinds of information indicating the driving situation of the plug-in hybrid vehicle 10 on which the tachograph is mounted, from sensors (not shown) mounted on the vehicle in, for example, a periodical manner, and accumulates the obtained information in the tachograph DB 17 as time series information. The tachograph DB 17 is a storage device from and into which information can be read and written. For example, the information to be stored in the tachograph DB 17 includes the vehicle speed, the number of revolutions of the engine, the driving time, the travel distance, the maximum speed, the average speed; and the time when the speed exceeds a predetermined speed.

Similarly with a usual vehicle navigation apparatus, the navigation apparatus 18 has functions of: receiving radio waves from a plurality of GPS (Global Positioning System) satellites to measure the current position of the own vehicle; displaying a map containing the current position on a screen as an image; searching a route from the current position to a designated destination; and receiving a signal transmitted from a beacon transmitter disposed on a road to obtain traffic information relating traffic jam information, accident information, and the like. The navigation DB 19 is a storage device from and into which information can be read and written, and holds map information and the like to be used by the navigation apparatus 18.

As shown in FIG. 1, the digital tachograph 16 and the navigation apparatus 18 are connected to the PLC unit 14. The PLC unit 14 performs the control described later, whereby information stored in the tachograph DB 17 is transferred toward the personal computer 26 on the side of the power supply equipment 20, that stored in the navigation DB 19 is transferred toward the personal computer 26, and the contents of the navigation DB 19 is updated to latest information by using information transmitted from the side of the personal computer 26.

In the configuration example shown in FIG. 1, the PLC unit 14, the digital tachograph 16, and the navigation apparatus 18 are configured as independent apparatuses. Alternatively, a part or the whole of these apparatuses may be integrally configured as a single apparatus.

A power supply line on the input side of the charging circuit 12 is connected to the vehicle-side socket 11 via a charge switch SW. When the power supply socket 21a on the side of the power supply equipment 20 is electrically connected to the vehicle-side socket 11 through the charging electrical cable 15, therefore, the commercial AC power which is supplied from the power supply equipment 20 is applied to the charging circuit 12 via the charge switch SW. The charging circuit 12 produces predetermined DC power which is required in the charging operation, from the supplied commercial AC power, and supplies the DC power to the battery 13 to charge the battery. The charge switch SW is a switch which can electrically control the connection state, such as a relay.

As shown in FIG. 2, the PLC unit 14 which is mounted on the side of the plug-in hybrid vehicle 10 includes a PLC modem 141, a controlling portion 142, a vehicle ID holding portion 143, a charging history holding portion 144, a driver circuit 145, and an ID database 146.

In the same manner as a usual PLC modem which is commercially available, the PLC modem 141 can transmit information with another station (another PLC modem) connected to the same power line, through the power line. In the information transmission, a carrier wave having a high frequency is used, and hence information can be transmitted without affecting the power supply.

The vehicle ID holding portion 143 is a nonvolatile memory, and holds information of unique identification information (vehicle-side IDs) which is predetermined for each vehicle. The IDs held by the vehicle ID holding portion 143 cannot be rewritten.

The charging history holding portion 144 is a nonvolatile memory. The contents of charging history information held by the charging history holding portion 144 are successively added or updated by history information which is produced under the control of the controlling portion 142 when the charging operation is performed.

The ID database 146 is a nonvolatile memory for holding the identification information (power supply-side IDs) which is uniquely allocated to each of the various power supply facilities 20, and used for, with respect only to a specific power supply equipment 20 in which security of information transfer has been confirmed by, for example, the user of the vehicle or a special administrator, registering and holding a power supply-side ID that is allocated to the power supply equipment. For example, there is a possibility that, when information of the vehicle side is transferred to the power supply equipment 20 which is disposed in a public place, the transferred information may leak to a third party. Therefore, the power supply-side ID of the equipment is not registered in the ID database 146. By contrast, with respect to the power supply equipment 20 which is disposed in the home of the owner of the vehicle, and that, in a company of a specific business managing the vehicle, the possibility of leakage of transferred information may be low. Therefore, the power supply-side IDs of the facilities are registered in the ID database 146 as an equipment in which security has been confirmed.

The controlling portion 142 is a microcomputer for controlling the operation of the PLC unit 14, and performs the control shown in FIG. 3 by using the PLC modem 141, vehicle ID holding portion 143, charging history holding portion 144, driver circuit 145, and ID database 146 which are connected to the controlling portion 142. As a result of the control, history information related to a charging operation is produced, and the history information is stored in the charging history holding portion 144. By the control of the controlling portion 142, when a charging operation is performed, information is transferred between the side of the plug-in hybrid vehicle 10 and that of the power supply equipment 20 through the power supply line (charging electrical cable 15). FIG. 8 shows a specific example of the history information stored in the charging history holding portion 144.

FIG. 3 schematically shows the operation of the PLC unit 14 mounted on the plug-in hybrid vehicle 10. Referring to FIG. 3, the operation of the PLC unit 14 will be described.

In step S11, the controlling portion 142 activates the PLC modem 141.

In step S12, the controlling portion 142 checks whether the plug-in hybrid vehicle 10" and the power supply equipment 20 are connected to each other through the charging electrical cable 15 or not. Namely, the controlling portion checks whether or not the power supply plug 15a of the charging electrical cable 15 is connected to the power supply socket 21a, and a power supply socket 15b is connected to the vehicle-side socket 11 to set a chargeable state. Actually, detection of whether the power supply socket 15b is inserted or not may be performed in the vicinity of the vehicle-side socket 11 by a switch, a sensor, or the like, it may be checked whether a predetermined power supply voltage appears in an electrode of the vehicle-side socket 11 or not, or it may be checked whether there is the carrier wave transmitted from the PLC modem on the side of the power supply equipment 20 or not.

In step S13, the controlling portion 142 checks whether the PLC modem 141 is set to a state where it can communicate with the PLC modem on the side of the power supply equipment 20 or not. In the case where the power-supply side charge monitoring apparatus 22 is connected to the power supply socket 21c on the side of the power supply equipment 20 as shown FIG. 1, the PLC modem 25 in the power-supply side charge monitoring apparatus 22 operates as described later, and hence the PLC modem 141 in the plug-in hybrid vehicle 10 is set to the state where it is communicable with the side of the power supply equipment 20 (the state where a communication path is established). When the communicable state is set, the process proceeds to next step S14.

In step S14, the controlling portion 142 reads the identification information held by the vehicle ID holding portion 143, and transmits the ID as the vehicle-side ID by PLC communication. Namely, the vehicle-side ID is sent from the PLC modem 141 to the PLC modem 25 through a power line route of the power supply line—the vehicle-side socket 11—the charging electrical cable 15—the power supply socket 21a.

After the PLC unit 14 in the plug-in hybrid vehicle 10 sends the vehicle-side ID, as described later, the power supply-side ID is transmitted from the power-supply side charge monitoring apparatus 22 connected to the side of the power supply equipment 20, by PLC communication. In next step S15, therefore, the controlling portion 142 waits for transmission of the power supply-side ID from the PLC unit 14. When the power supply-side ID is received, the process proceeds to next step S16, and the received power supply-side ID is recorded into the charging history holding portion 144.

In next step S17, the PLC unit 14 transmits a predetermined authentication request signal to the power-supply side charge monitoring apparatus 22. In response to the authentication request, the power-supply side charge monitoring apparatus 22 replies a result of authentication. Therefore, the PLC unit 14 checks the authentication result in step S18. If the authentication is OK, the process proceeds to step S19, and, if the authentication is NG, the process proceeds to step S25.

In step S19, the controlling portion 142 controls the charge switch SW via the driver circuit 145 so as to be switched to the ON state where charging is enabled, or namely drives the charge switch SW so as to connect the power supply line, whereby the power supplied from the side of the power supply equipment 20 to the vehicle-side socket 11 through the charging electrical cable 15 is given to the charging circuit 12. At this timing, therefore, the charging circuit 12 starts the operation of charging the battery 13.

In step S20, the controlling portion 142 checks whether the charging operation is ended or not. For example, the charging operation can be deemed to be ended, in the case such as that where the user operates an end button which is not shown, that where sufficient power is stored in the battery 13 and the current flowing from the charging circuit 12 to the battery 13 becomes less than a predetermined level, that where the charging electrical cable 15 is removed, or that where the carrier wave transmitted from the partner PLC modem is not detected. During the charging operation, the processes of steps S20 to S24 and S26 to S28 are repeatedly performed.

During the charging operation, i.e., during a period when the plug-in hybrid vehicle 10 and the power supply equipment 20 are connected to each other and power is supplied from the power supply equipment 20 toward the plug-in hybrid vehicle 10, the power supply-side ID is repeatedly transmitted from the power-supply side charge monitoring apparatus 22 as described later. On the power line such as the charging electrical cable 15, as in the signal shown in FIG. 9, for example, information of the power supply-side ID which is transmitted as a PLC signal by the power-supply side charge monitoring apparatus 22 repeatedly appears for a predetermined time period (X1 seconds), the information of the power supply-side ID then again repeatedly appears for the predetermined time period (X2 seconds) after a separation of a predetermined time period, and, after another separation of a predetermined time period, the information of the power supply-side ID then again repeatedly appears for the predetermined time period (X3 seconds). In the example, X1, X2, and X3 are equal to one another.

In step S21, the controlling portion 142 checks whether the PLC modem 141 continues the reception of the power supply-side ID transmitted by the power-supply side charge monitoring apparatus 22 or detects interruption of the reception corresponding to the separation. If the reception is continued, the process proceeds to step S22, and, if the separation is detected, the process proceeds to step S23.

In step S22, the controlling portion 142 controls so that the identification information read from the vehicle ID holding portion 143 is again transmitted as the vehicle-side ID from the PLC modem 141. During the charging operation, namely, the vehicle-side ID is repeatedly transmitted from the power-supply side charge monitoring apparatus 22 to the power supply equipment 20, and the power supply-side ID is repeatedly transmitted from the power supply equipment 20 to the plug-in hybrid vehicle 10.

In step S23, the controlling portion 142 counts the number of receptions in which the power supply-side ID is received, and records the reception number into the charging history holding portion 144. Specifically, the detection number of separations indicating that the reception of the power supply-side ID is temporarily interrupted is counted, and the separation number is recorded into the charging history holding portion 144. In the case where the PLC modem 141 receives the signal shown in FIG. 9, for example, the separation between the periods of X1 and X2 is detected as a first separation, that between the periods of X2 and X3 is detected as a second separation, and, after the period of X3 is ended, a third separation is detected. Every time a separation is detected, the separation detection number which is recorded as the history in the charging history holding portion 144 is updated.

In step S24, the controlling portion 142 records the power supply-side ID which is finally detected by the PLC modem 141, as the history into the charging history holding portion 144. Furthermore, the finally detected power supply-side ID is compared with that recorded in the charging history holding portion 144, and it is checked whether the IDs are coincident with each other or not. If coincident, it is not necessary to update the record, but, if not coincident, the finally detected power supply-side ID is additionally recorded into the charging history holding portion 144 as a new history.

In step S26, the controlling portion 142 compares the power supply-side ID which is finally detected in step S21, with the IDs registered in the ID database 146, and checks whether coincidence is attained or not. Namely, it is checked whether the power supply-side ID of the power supply equipment 20 which is connected for the purpose of charging of the plug-in hybrid vehicle 10 is identical with one of the IDs in which security is previously confirmed (one of the IDs registered in the ID database 146). If coincidence is attained, the process proceeds to step S27, and, if coincidence is not attained, the process returns to step S20.

In step S27, the controlling portion 142 checks whether the PLC modem 141 receives a transmission stop command from the side of the power supply equipment 20 or not. If not received, the process proceeds to step S28, and, if received, the process returns to step S20.

In step S28, the controlling portion 142 obtains information which is accumulated by the digital tachograph 16 in the tachograph DB 17, and sequentially transmits the information toward the power supply equipment 20 via the PLC modem 141.

When the charging operation is to be ended, the process proceeds from step S20 to step S25. In step S25, the controlling portion 142 controls the charge switch SW via the driver circuit 145 so as to disconnect the input of the charging circuit 12 from the power line such as the vehicle-side socket 11, thereby ending the charging operation.

When the PLC unit 14 performs the control shown in FIG. 3, during the charging operation, various kinds of information stored in the tachograph DB 17 are automatically transferred to the personal computer 26 on the side of the power supply equipment 20 through the charging electrical cable 15. In the transferring of the information of the tachograph to the personal computer 26, therefore, it is not required to use a wireless communication network; a memory card, or the like, and hence the problem of the communication cost, that of security related to information to be transferred, and the like can be solved.

When the charging operation is performed, for example, history information shown in FIG. 8 is recorded and stored in the charging history holding portion 144. In the example shown in FIG. 8, information of the history indicating each charging operation includes "History number", "Power supply-side ID", and "Connection time". In the above, "History number" is a number indicating the order of performing the charging operation, "Power supply-side ID" is identification information which is received from the side of the power supply equipment 20 by the PLC modem 141, and "Connection time" means the separation detection number which is recorded in step S23. Since the separation appears at constant time intervals; the separation detection number corresponds to the length of the connection time or the time during which the charging operation is performed. In this way, "Connection time" is recorded for each "Power supply-side ID". Therefore, it is possible to know the amount of the electrical power that is supplied from "Power supply-side ID" to the vehicle in which these information is recorded.

FIG. 4 schematically shows the operation of the personal computer 26 in the power-supply side charge monitoring apparatus 22 connected to the power supply equipment 20. The operation shown in FIG. 4 will be described.

In step S31, the personal computer 26 activates the PLC modem 25.

In step S32, the personal computer 26 checks whether the PLC modem 25 is communicable with the PLC modem 141 on the side of the plug-in hybrid vehicle 10 or not. When the plug-in hybrid vehicle 10 is connected to the power supply equipment 20 through the charging electrical cable 15 and the PLC unit 14 in the plug-in hybrid vehicle 10 operates, the PLC modem 25 is communicable with the PLC modem 141 in the PLC unit 14. In this case, therefore, the process proceeds to next step S33.

In step S33, the personal computer 26 checks whether the PLC modem 25 receives the vehicle-side ID transmitted from the side of the plug-in hybrid vehicle 10 or not. If the vehicle-side ID is received, the process proceeds to next step S34.

In step S34, the personal computer 26 records the vehicle-side ID received in step S33, into the charging history holding portion 27.

In step S35, the personal computer 26 reads the power supply-side ID which is previously registered therein, and sends the power supply-side ID to the side of the plug-in hybrid vehicle 10 via the PLC modem 25 by PLC communication. Therefore, the PLC unit 14 on the side of the plug-in hybrid vehicle 10 can know the power supply-side ID.

In step S36, the personal computer 26 checks whether the PLC modem 25 receives the authentication request signal from the side of the plug-in hybrid vehicle 10 or not. If the signal is received, the process proceeds to step S37.

In step S37, the personal computer 26 compares vehicle-side ID received in step S33 with IDs registered in an ID database 29, and checks whether there is a coincident ID or not. In the ID database 29, information of vehicle-side IDs respectively allocated to vehicles which can use the electrical power supply installation 30 are registered and held. In the case where the power supply equipment 20 is a fee charging public equipment, for example, it may be contemplated to perform a control in which, when payment of a fee is confirmed on the side of the power supply equipment 20, the vehicle-side ID of the corresponding vehicle is registered into the ID database 29.

In step S38, the personal computer 26 transmits a result of the authentication in step S37 to the side of the plug-in hybrid vehicle 10 via the PLC modem 25.

In step S39, the personal computer 26 checks whether the connection state between the power supply equipment 20 and the plug-in hybrid vehicle 10 is continued or not. Specifically, detection of whether the power supply plug 15a of the charging electrical cable 15 is connected to the power supply socket 21a or not is performed by a switch or the like (not shown) in the vicinity of the power supply socket 21a, or it is checked whether there is the carrier wave sent onto the charging electrical cable 15 by the PLC modem 141 on the side of the plug-in hybrid vehicle 10 or not.

In step S40, the personal computer 26 again transmits the power supply-side ID to the side of the plug-in hybrid vehicle 10 via the PLC modem 25 by PLC communication. Since step S40 is repeatedly performed, the power supply-side ID is repeatedly transmitted in a short period from the PLC modem 25 during when the plug-in hybrid vehicle 10 is connected to the power supply equipment 20. As described above, also the PLC modem 141 on the side of the plug-in hybrid vehicle 10 repeatedly transmits the vehicle-side ID. Therefore, the personal computer 26 successively fetches the received vehicle-side ID which is received by the PLC modem 25, and checks whether the ID coincides with one of the IDs registered in the ID database 29 or not.

In step S51, the personal computer 26 checks whether the stored information (in this example, the stored information of the tachograph) sent out from the plug-in hybrid vehicle 10 is received by the PLC modem 25 or not. If received, the process proceeds to step S52, and, if not received, the process proceeds to step S41.

In step S52, the personal computer 26 controls the PLC modem 25 so as to perform the process of receiving stored information, and sequentially stores the received stored information into the tachograph DB 41.

In step S53, the personal computer 26 checks whether the reception of all stored information is completed or not. If the reception is completed, the process proceeds to step S54, and, if not completed, the process proceeds to step S41.

In step S54, the personal computer 26 transmits a predetermined transmission stop command by using the PLC modem 25 in order to notify the side of the plug-in hybrid vehicle 10 that the reception of stored information is completed.

In step S41, the personal computer 26 checks whether a constant time period (X seconds) which is preset has elapsed or not. If not elapsed, the process proceeds to step S39, and, if elapsed, the process proceeds to step S42 after elapse of the time period. Namely, the process subsequent to step S42 is performed at intervals of the constant time period (X seconds).

In step S42, the personal computer 26 produces a separation time period for interrupting the transmission of the power supply-side ID. Specifically, the personal computer waits for elapse of a predetermined time period, and halts the execution of step S40 during the tome period to stop the transmission of the power supply-side ID.

Figure 9:
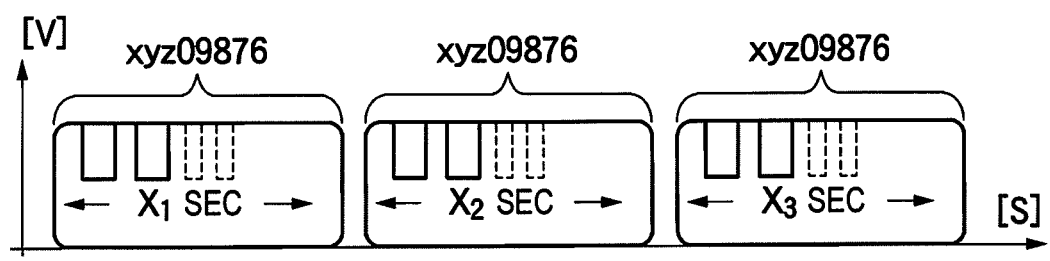
FIG. 9 is a time chart showing a configuration example of a signal transmitted through a charging electrical cable.

Therefore, the signal sent from the PLC modem 25 toward the charging electrical cable 15 by PLC communication is set to a state such as shown in FIG. 9. Namely, information of the power supply-side ID which is transmitted by the PLC modem 25 as a PLC signal repeatedly appears for the predetermined time period (X1 seconds), the information of the power supply-side ID then again repeatedly appears for the predetermined time period (X2 seconds) after a separation of a predetermined time period, and, after another separation of a predetermined time period, the information of the power supply-side ID then again repeatedly appears for the predetermined time period (X3 seconds). In the example, X1, X2, and X3 have the same length (X seconds).

As described above, during a period when the side of the power supply equipment 20 transmits information of the power supply-side ID, also the PLC unit 14 on the side of the plug-in hybrid vehicle 10 repeats transmission of the vehicle-side ID. Therefore, also the signal which is sent out by the PLC unit 14 is identical with that of FIG. 9. Namely, information of the vehicle-side ID which is transmitted by the PLC modem 141 as a PLC signal repeatedly appears for the predetermined time period (X1 seconds), the information of the vehicle-side ID then again repeatedly appears for the predetermined time period (X2 seconds) after a separation of a predetermined time period, and, after another separation of a predetermined time period, the information of the vehicle-side ID then again repeatedly appears for the predetermined time period (X3 seconds).

In step S43, the personal computer 26 counts the number of receptions in which the vehicle-side ID is received, and records the reception number into the charging history holding portion 27. Specifically, the number of separations in step S42 is counted, and the separation number is recorded as a history into the charging history holding portion 27. In the case where the finally received vehicle-side ID is different from the previously received vehicle-side IDs, the separation number is cleared, and the counting process is again started from zero.

In step S44, the personal computer 26 records the vehicle-side ID which is finally received by the PLC modem 25, as a history into the charging history holding portion 27. Furthermore, the finally detected vehicle-side ID is compared with that recorded in the charging history holding portion 27, and it is checked whether the IDs are coincident with each other or not. If coincident, it is not necessary to update the record, but, if not coincident, the finally detected vehicle-side ID is additionally recorded into the charging history holding portion 27 as a new history.

As a result of the process shown in FIG. 4 and performed by the power-supply side charge monitoring apparatus 22, when the plug-in hybrid vehicle 10 is connected to the power supply equipment 20 and the charging operation is performed, information accumulated by the digital tachograph 16 of the plug-in hybrid vehicle 10 can be automatically transferred to the power-supply side charge monitoring apparatus 22 by using the power supply line, and the transferred information can be stored into the tachograph DB 41. In the transferring of the information of the tachograph to the personal computer 26, therefore, it is not required to use a wireless communication network, a memory card, or the like, and hence the problem of the communication cost, that of security related to information to be transferred, and the like can be solved.

When the charging operation is performed, for example, history information shown in FIG. 7 is recorded and stored in the charging history holding portion 27. In the example shown in FIG. 7, information of the history indicating each charging operation (power supplying operation) includes "History number", "Vehicle-side ID", and "Connection time". In the above, "History number" is a number indicating the order of performing the charging operation, "Vehicle-side ID" is identification information which is received from the side of the plug-in hybrid vehicle 10 by the PLC modem 25, and "Connection time" means the separation detection number which is recorded in step S43. Since the separation appears at intervals of the constant time (X seconds), the separation detection number corresponds to the length of the connection time or the time during which the charging operation is performed. In this way, "Connection time" is recorded for each "Vehicle-side ID". Therefore, it is possible to know the amount of the electrical power that is supplied to each vehicle.

The timing of transmitting the vehicle-side ID as a PLC signal by the PLC unit 14 on the side of the plug-in hybrid vehicle 10, that of transmitting the power supply-side ID as a PLC signal by the power-supply side charge monitoring apparatus 22 on the side of the power supply equipment 20, and the like can be changed as required. However, it is preferred that the transmissions of the vehicle-side ID and the power supply-side ID are repeated at a relatively short period.

As described above, the operation shown in FIG. 3 is performed by the PLC unit 14, and that shown in FIG. 4 is performed by the power-supply side charge monitoring apparatus 22, whereby the charging operation can be controlled, and information of the tachograph stored in the side of the plug-in hybrid vehicle 10 can be automatically transferred to the side the power-supply side charge monitoring apparatus 22.

FIG. 5 shows a modification of the operation shown in FIG. 3, and FIG. 6 shows a modification of the operation shown in FIG. 4. The operation shown in FIG. 5 is performed by the PLC unit 14, and that shown in FIG. 6 is performed by the power-supply side charge monitoring apparatus 22, whereby the charging operation can be controlled, information held by the navigation DB 19 on the side of the vehicle can be transferred to the side of the power-supply side charge monitoring apparatus 22, and conversely information held in the side of the power-supply side charge monitoring apparatus 22 can be transferred to the side of the vehicle.

In FIGS. 5 and 6, the steps corresponding to those in FIGS. 3 and 4 are denoted by the same step numbers. In FIG. 5, namely, step S28 in FIG. 3 is changed to steps S61 to S64, and, in FIG. 6, steps S71 and S72 are added between steps S54 and S41. The operation of the changed places will be described below.

In step S60 shown in FIG. 5, the PLC unit 14 in the plug-in hybrid vehicle 10 obtains information to be transferred, via the navigation apparatus 18 among the information stored in the navigation DB 19, and transmits the information to the side of the power-supply side charge monitoring apparatus 22 by PLC communication.

As a specific example of the information which is transmitted in step S60 by the PLC unit 14, traffic information (traffic jam information, accident information, and the like) which is obtained by the navigation apparatus 18 from a beacon transmitter disposed on a road, coordinate information of a position which is designated as a hazardous location by the user (driver), version information of the map data existing in the navigation DB 19, and the like are assumed.

In step S61, the PLC unit 14 in the plug-in hybrid vehicle 10 checks whether information transmitted from the power-supply side charge monitoring apparatus 22 is received from the power supply line or not. If received, the process proceeds to step S62, and, if not received, the process returns to step S20.

In step S62, the PLC unit 14 controls the PLC modem 141 so as to perform the receiving process, and temporarily stores the received information into a predetermined storage device.

In step S63, the PLC unit 14 checks whether reception of all information to be transferred is completed or not. If reception is completed, the process proceeds to step S64, if not completed, the process returns to step S20.

In step S64, the PLC unit 14 updates information in the navigation DB 19 to latest information by using the information which is received in step S62.

In a database such as a map which can be used by the navigation apparatus 18, for example, latest information can be periodically obtained, and such information is usually provided in the form of an information recording medium such as a DVD, or from a server which is on the Internet, and to which the apparatus can be on-line connected. In the case where an information recording medium such as a DVD is used, however, a DVD driver for reading the medium is required, and in the case where the navigation apparatus 18 mounted on a vehicle is connected to the Internet or the like and data are downloaded, there is a possibility that the communication cost may be expensive. In the system shown in FIG. 1, therefore, latest information such as a map is registered in the navigation DB 42 on the side of the power-supply side charge monitoring apparatus 22, data of the navigation DB 42 are transferred toward the plug-in hybrid vehicle 10 through the power supply line during a period when a charging operation is performed on the plug-in hybrid vehicle 10, and, by using the data, the map and the like in the navigation DB 19 are automatically updated to data of the latest version. As information to be transferred from the side of the power-supply side charge monitoring apparatus 22 to the plug-in hybrid vehicle 10, for example, travel plan information (information related to the destination, information related to the possible travelling route, the schedule, and the like) which is previously produced by the user may be used in addition to map data.

In step S71 shown in FIG. 6, by contrast, the personal computer 26 checks whether latest information to be transferred is registered in the navigation DB 42 or not. Specifically, registration dates and times of respective information are compared with each other, or the version of the map data on the side of the vehicle is compared with that of the map data in the navigation DB 42. If latest information is registered, the process proceeds to step S72, and, if not registered, the process proceeds to step S41.

In step S72, the personal computer 26 obtains the latest information from the navigation DB 42, and transmits the information to the side of the plug-in hybrid vehicle 10 via the PLC modem 25.

Alternatively, both the operation shown in FIG. 3 and that shown in FIG. 5 may be performed in the side of the PLC unit 14, and both the operation shown in FIG. 4 and that shown in FIG. 6 may be performed in the side of the power-supply side charge monitoring apparatus 22. According to the configuration, both the transfer of information related to the tachograph function, and that of information related to the navigation function can be performed during the charging operation.

As described above, the charge monitoring apparatus of the invention can be used for monitoring an operation of charging a battery mounted on a vehicle such as an electric vehicle or a hybrid vehicle, and particularly also for performing transfer of information between the vehicle side and an apparatus outside the vehicle while using a power supply line connecting the vehicle side and the power supply side during a charging operation, as a transmission line. In information transfer, therefore, it is not required to use a wireless communication network, and to use a detachable information recording medium such as a memory card or a DVD, and the apparatus is useful for reducing the communication cost, and ensuring security related to information to be transferred.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2008-314815 filed on Dec. 10, 2008, the contents of which are incorporated herein for reference.

What is claimed is:

1. A charge monitoring apparatus that is mountable on or connectable to a vehicle which uses electrical power supplied from a battery on the vehicle for traveling, the charge monitoring apparatus monitoring a supply of the electrical power to the battery from an external power supply equipment which is disposed separately from the vehicle, the charge monitoring apparatus, comprising:
   a vehicle ID holding portion that holds vehicle-side identification information which is uniquely allocated to each specific vehicle;
   a power-line communicating portion that performs a power line communication with an extravehicular apparatus through a power supply line which supplies the electric power from the external power supply equipment to the battery, the extravehicular apparatus connected to the external power supply equipment;
   a vehicle-side information storing portion that stores information indicating a driving situation of the vehicle which is produced in the vehicle; and
   a communication controlling portion that, in the power line communication, transmits the vehicle-side identification information held in the vehicle ID holding portion to the extravehicular apparatus, and if predetermined condition is satisfied, the communication controlling portion transmits the information stored in the vehicle-side information storing portion to the extravehicular apparatus,
   wherein the information stored in the vehicle-side information storing portion includes a vehicle speed and a number of revolutions of an engine of the vehicle.

2. The charge monitoring apparatus according to claim 1, further comprising:
   an information update controlling portion that, in the power line communication, receives information sent from the extravehicular apparatus via the power-line communicating portion, and updates a content of the information stored in the vehicle-side information storing portion, by using the received information.

3. The charge monitoring apparatus according to claim 1, wherein in the power line communication, the communication controlling portion receives connection destination identification information indicating the extravehicular apparatus from the extravehicular apparatus via the power supply line, and compares the connection destination identification information with pre-registered information preliminary registered in the vehicle, and only in a case of coincidence between the connection destination identification information and the pre-registered information, the communication controlling portion transmits information stored in the vehicle-side information storing portion to the extravehicular apparatus.

4. The charge monitoring apparatus that is mountable on or connectable to a vehicle which uses electrical power supplied from a battery on the vehicle for traveling, the charge monitoring apparatus monitoring a supply of the electrical power to the battery from an external power supply equipment which is disposed separately from the vehicle, the charge monitoring apparatus, comprising:
   a vehicle ID holding portion that holds vehicle-side identification information which is uniquely allocated to each specific vehicle;
   a power-line communicating portion that performs a power line communication with an extravehicular apparatus through a power supply line which supplies the electric power from the external power supply equipment to the battery, the extravehicular apparatus connected to the external power supply equipment;
   a vehicle-side information storing portion that stores information produced in the vehicle; and
   a communication controlling portion that, in the power line communication, transmits the vehicle-side identification information held in the vehicle ID holding portion to the extravehicular apparatus, and if predetermined condition is satisfied, the communication controlling portion transmits the information stored in the vehicle-side information storing portion to the extravehicular apparatus,
   wherein the information stored in the vehicle-side information storing portion includes at least one of traffic information and history information of traveling route of the vehicle.

5. A charge monitoring apparatus that is connectable through a power supply line to a vehicle which uses electrical power supplied from a battery on the vehicle for traveling, the charge monitoring apparatus being connected to an external power supply equipment which is disposed separately from the vehicle, in order to monitor a supply of the electrical power from the external power supply equipment to the battery, the charge monitoring apparatus, comprising:
   a power supply ID holding portion that holds power supply-side identification information which is uniquely allocated to a specific external power supply equipment;
   a power-line communicating portion that performs a power line communication with a communication portion on the vehicle through a power supply line which supplies the electric power from the external power supply equipment to the battery; and a power supply-side reception controlling portion that, in the power line communication, transmits the power supply-side identification information held in the power supply ID holding portion to the vehicle, receives information transmitted from the vehicle via the power supply line, and stores the received information in a power supply-side storing portion.

6. The charge monitoring apparatus according to claim 5, further comprising:

a map information holding portion that successively obtains latest map information; and a power supply-side transmission controlling portion that, in the power line communication, transmits the latest map information held in the map information holding portion to the vehicle via the power supply line.

* * * * *